K. ALQUIST.
MEANS FOR GRINDING OR POLISHING GEARS.
APPLICATION FILED MAR. 4, 1914.

1,154,830.
Patented Sept. 28, 1915.

WITNESSES:
Anthony Marx.
J. Ellis Glen

INVENTOR:
KARL ALQUIST,
BY
Albert G. Davis
HIS ATTORNEY.

UNITED STATES PATENT OFFICE.

KARL ALQUIST, OF SCHENECTADY, NEW YORK.

MEANS FOR GRINDING OR POLISHING GEARS.

1,154,830.   Specification of Letters Patent.   Patented Sept. 28, 1915.

Application filed March 4, 1914. Serial No. 822,509.

*To all whom it may concern:*

Be it known that I, KARL ALQUIST, a subject of the King of Sweden, residing at Schenectady, county of Schenectady, State of New York, have invented certain new and useful Improvements in Means for Grinding or Polishing Gears, of which the following is a specification.

This invention relates to spur gearing and has for its object to provide an improved apparatus for grinding or polishing the teeth of such gearing.

For a consideration of what I believe to be novel and my invention, attention is directed to the accompanying description and the claims appended thereto.

Figure 1:
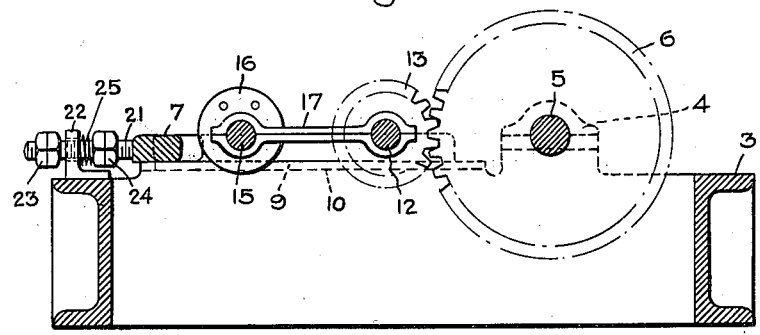
Figure 2:
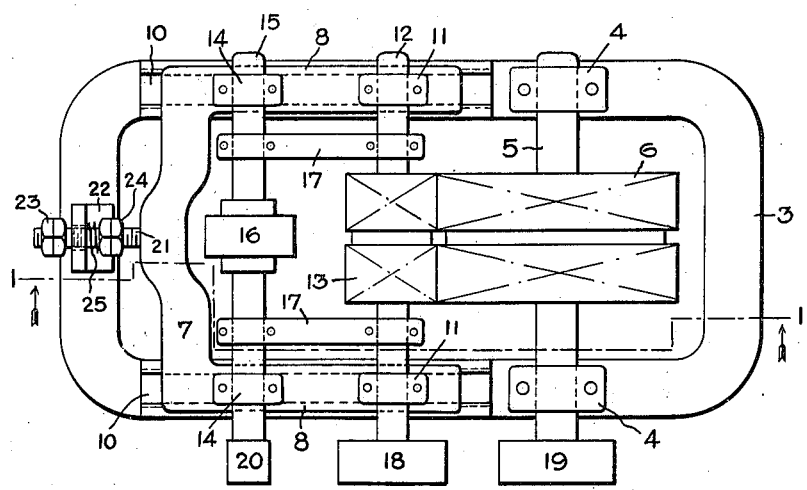
Figure 3:
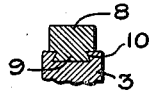

In the accompanying drawing wherein I have illustrated one form of apparatus by which my improved method may be carried out, Figure 1 is a longitudinal sectional view on line 1—1 of Fig. 2; Fig. 2 is a plan view, and Fig. 3 is a detail sectional view.

Referring to the drawing, 3 is a frame or support provided with suitable bearings 4 in which may be mounted a shaft 5 carrying a helical gear 6. Movably mounted on frame 3 which may be termed the main frame, is a second or auxiliary frame or support 7. This frame is shown as being U-shaped, the two arms 8 of the U sliding on the main frame. In order to guide its movements the two legs of the U are provided with dove-tailed projections 9 sliding in similar grooves 10 in the frame 3. The frame 7 has suitable bearings 11 in which may be mounted a shaft 12 carrying a gear 13 in mesh with the gear 6. The frame 7 has also a second set of bearings 14 in which is mounted a shaft 15 carrying at or near its center an eccentrically mounted disk 16. The shafts 12 and 15 may be provided with tie straps 17 having bearings if desired in order to give greater rigidity to the structure.

In operation the gears are mounted as shown, one on frame 3 and the other on frame 7 and driving power is then applied to the shaft 12 through pulley 18, a suitable load being at the same time applied to a brake drum 19 on shaft 5 so as to give the desired pressure between the teeth. At the same time the shaft 15 is revolved at high speed by means of the pulley 20 thereby revolving the eccentric disk or mass 16 and causing the frame 7 to vibrate with a high frequency, said vibration taking place in the plane of the shafts and the meshing gear teeth.

If found desirable means may be provided for limiting the movement of the frame 7, and in connection therewith means may also be provided for biasing the frame to a position where the teeth of the gears are fully in mesh. In the drawing I have shown a threaded stud 21 projecting from frame 7 through an opening in the bracket 22 fixed on frame 3. Threaded on the stem on opposite sides of the bracket are the nuts 23 and 24 which may be adjusted to permit of the desired movement. Between the nuts 24 and the bracket 22 is arranged a spring 25 which serves to bias the teeth into engagement.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:—

1. An apparatus for polishing gears comprising a plurality of supports movable relative to each other, means for mounting gears thereon so that the same may mesh and one may be driven through the other, and means comprising a shaft having a weight eccentrically disposed thereon for rapidly moving said supports toward and away from each other to vary the distance between the centers of the gears.

2. An apparatus for polishing gears comprising a frame, means for mounting a gear on said frame, a second frame movably mounted on the first named frame, means for mounting a gear on the movable frame so that the same may mesh with a gear on the first named frame whereby gears mounted on the frames may be driven one through the other, and means for rapidly moving the second named frame to vary the distance between the centers of gears mounted thereon.

3. An apparatus for polishing gears comprising a main frame, means for mounting a gear on said frame, an auxiliary frame carried by the main frame and arranged to reciprocate thereon, means for mounting a gear on the auxiliary frame so that it may mesh with a gear on the main frame whereby gears mounted on the frames may be driven one through the other, a shaft carried by the auxiliary frame, and an eccentric mounted on the shaft whereby when said shaft is revolved the eccentric will cause the frame to reciprocate.

4. In an apparatus for polishing gears, the combination of a pair of frames which are movable relative to each other, means for mounting gears thereon so that they are in mesh and one may be driven through the other, means whereby said gears may be loaded, and a shaft comprising eccentric means for rapidly moving the frames relative to each other to produce a vibratory motion of the gears in the plane of their axes.

5. In an apparatus for polishing gears, the combination of a pair of frames which are movable relative to each other, means for mounting gears thereon so that they are in mesh and one may be driven through the other, means whereby said gears may be loaded, a shaft comprising eccentric means for rapidly moving the frames relative to each other to produce a vibratory motion of the gears in the plane of their axes, and means for limiting the extent of said vibratory motion.

6. In an apparatus for polishing gears, the combination of a pair of frames which are movable relative to each other, means for mounting gears thereon so that they are in mesh and one may be driven through the other, means whereby said gears may be loaded, a shaft comprising eccentric means for rapidly moving the frames relative to each other to produce a vibratory motion of the gears in the plane of their axes, and yielding means normally biasing the gears into engagement for limiting the extent of said vibratory motion.

In witness whereof, I have hereunto set my hand this 2nd day of March, 1914.

KARL ALQUIST.

Witnesses:
FRED PARANT,
HELEN ORFORD.